(12) United States Patent
Berglund et al.

(10) Patent No.: US 8,890,005 B2
(45) Date of Patent: Nov. 18, 2014

(54) HIGH VOLTAGE ARRANGEMENT COMPRISING AN INSULATING STRUCTURE

(71) Applicants: Mats Berglund, Ludvika (SE); Anders Bo Eriksson, Ludvika (SE); Erik Wedin, Ludvika (SE); Jan Lindgren, Grangesberg (SE); Mats Ramkvist, Ludvika (SE); Stina Bertilsson, Smedjebacken (SE); Tina Brunstrom, Ludvika (SE)

(72) Inventors: Mats Berglund, Ludvika (SE); Anders Bo Eriksson, Ludvika (SE); Erik Wedin, Ludvika (SE); Jan Lindgren, Grangesberg (SE); Mats Ramkvist, Ludvika (SE); Stina Bertilsson, Smedjebacken (SE); Tina Brunstrom, Ludvika (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 14/086,305

(22) Filed: Nov. 21, 2013

(65) Prior Publication Data
US 2014/0076625 A1   Mar. 20, 2014

Related U.S. Application Data

(63) Continuation of application No. PCT/EP2012/058813, filed on May 11, 2012.

(30) Foreign Application Priority Data

May 27, 2011   (EP) .................................... 11167797

(51) Int. Cl.
*H02G 3/04* (2006.01)
*H01F 27/04* (2006.01)
*H01F 27/32* (2006.01)

(52) U.S. Cl.
CPC ................. *H02G 3/04* (2013.01); *H01F 27/04* (2013.01); *H01F 27/324* (2013.01)
USPC ..... 174/650; 174/137 R; 174/142; 174/152 R

(58) Field of Classification Search
USPC ...... 174/650, 152 R, 152 G, 153 G, 652, 135, 174/142, 137 R, 151, 17 CT, 140 R, 11 BH, 174/15.1, 15.3; 439/587, 271, 272, 273, 439/274, 275; 16/2.1, 2.2; 361/600, 601, 361/679.01
See application file for complete search history.

(56) References Cited

U.S. PATENT DOCUMENTS 4,321,421 A * 3/1982 Pierce .......................... 174/15.1
4,370,512 A * 1/1983 Thomas ......................... 174/362
(Continued)

FOREIGN PATENT DOCUMENTS

| EP | 0795877 A2 | 9/1997 |
|----|-----------|--------|
| JP | S60193313 A | 10/1985 |
| WO | 2007111564 A1 | 10/2007 |

OTHER PUBLICATIONS

International Preliminary Report on Patentability, Application No. PCT/EP2012/058813, Completed: Aug. 6, 2013, 14 pages.

(Continued)

*Primary Examiner* — Angel R Estrada
(74) *Attorney, Agent, or Firm* — St. Onge Steward Johnston & Reens LLC

(57) ABSTRACT

A high voltage arrangement for a high voltage power system has an insulating structure which reduces the creep path. The insulating structure is arranged around the second conductor and has a continuous extension in an axial direction from a first end thereof providing insulation of essentially the entire length of the second conductor to a second end around the bushing portion, which second end extends around the bushing portion at least to a point where an electric potential of an external surface of the bushing portion is at most equal to the average of the potential of the first conductor and the potential of the interfacing plane when the high voltage arrangement is in use.

11 Claims, 2 Drawing Sheets

(56) References Cited

U.S. PATENT DOCUMENTS

| | | | | |
|---|---|---|---|---|
| 4,370,514 | A * | 1/1983 | Matthaus et al. | 174/143 |
| 6,346,677 | B1 * | 2/2002 | Guillemette et al. | 174/142 |
| 7,961,466 | B2 * | 6/2011 | Eriksson | 174/15.3 |
| 8,134,089 | B2 * | 3/2012 | Roseen et al. | 174/650 |
| 8,471,150 | B2 * | 6/2013 | Emilsson et al. | 174/140 R |
| 8,748,757 | B2 * | 6/2014 | Eriksson et al. | 174/650 |
| 8,759,683 | B2 * | 6/2014 | Ko et al. | 174/137 R |

OTHER PUBLICATIONS

International Search Report and Written Opinion of the International Searching Authority, Application No. PCT/EP2012/058813, Completed: Jun. 29, 2012; Mailing Date: Jul. 6, 2012, 11 pages.

Written Opinion of the International Preliminary Examining Authority, Application No. PCT/EP2012/058813, Mailing Date: May 16, 2013, 5 pages.

* cited by examiner

HIGH VOLTAGE ARRANGEMENT COMPRISING AN INSULATING STRUCTURE

FIELD OF THE INVENTION

The present disclosure generally relates to power systems and in particular to a high voltage arrangement comprising an insulating structure.

BACKGROUND OF THE INVENTION

In high voltage applications bushings are used for insulating a high voltage conductor when passing the conductor through a conductive structure having a different potential than the high voltage conductor. Bushings are for instance utilized in inductive devices such as transformers and reactors in order to be able to provide a high voltage conductor through the grounded housing of the device.

High Voltage Direct Current (HVDC) transformers are due to their connection to the DC grid subjected to both AC and DC voltage components. Therefore, such transformers need to be designed taking both AC and DC voltage stress considerations into account.

WO2007/111564 discloses a high voltage insulating system for HVDC and a method for manufacturing such an insulating system. WO2007/111564 discloses a bushing arranged in a turret of a transformer, a bushing conductor extending through the bushing, a connection between the bushing conductor and the transformer conductor extending from the transformer tank, and an insulating system comprising inter alia a cylindrical insulating barrier and a transformer insulating material enclosing the connection.

The arrangement of WO2007/111564 consumes quite a large amount of space in the turret if it is to fulfill the safety provisions concerning the handling of very high voltages.

JP60193313 discloses a direct current electric apparatus filled with oil. A DC transformer having a core around which a coil is wound. The DC transformer is filled with oil and has a bushing. At the bottom of the bushing, an insulation shield is provided around the bushing terminal. The bushing terminal and the coil are connected with an insulated high voltage lead wire consisting of a lead wire with an insulation layer.

EP0795877 discloses a DC bushing having an increased DC dielectric strength and includes a porcelain tube constituting a lower portion thereof and immersed in an insulating oil contained in a tank, a lower insulated shield provided at a lower end portion of the porcelain tube and composed of a shielding electrode covered with an insulating cover, and a shield barrier disposed around an outer periphery of the lower insulated shield with an oil gap being defined between the shield barrier and the lower insulated shield. The thickness of the shield barrier is greater than a width of the oil gap as viewed in a direction widthwise thereof.

Hence, there is a need to improve existing insulating solutions for high voltage applications in general, and for HVDC applications in particular.

SUMMARY OF THE INVENTION

A general objective of the present disclosure is to provide a high voltage arrangement in which the insulating system consumes less space while fulfilling the safety requirements concerning very high voltage equipment.

Another object is to provide a compact yet reliable high voltage arrangement.

Hence, in a first aspect of the present disclosure there is provided a high voltage arrangement for a high voltage power system, which high voltage arrangement comprises: an interfacing plane defining an interface between a first side and a second side of the high voltage arrangement; a bushing having a bushing portion received by the interfacing plane whereby the bushing extends from the first side to the second side of the high voltage arrangement; a first conductor extending through the bushing, which first conductor protrudes from the bushing portion at the second side of the high voltage arrangement; a second conductor connected to the first conductor at the second side; and an insulating structure arranged around the second conductor for providing insulation of the second conductor, wherein the insulating structure has a continuous extension in an axial direction from a first end thereof providing insulation of essentially the entire length of the second conductor to a second end of the insulating structure arranged around the bushing portion, which second end extends around the bushing portion at least to a point where an electric potential of an external surface of the bushing portion is at most equal to the average of the potential of the first conductor and the potential of the interfacing plane when the high voltage arrangement is in use.

By providing an insulating structure which extends continuously as it insulates the second conductor, the first conductor, the connection between the first conductor and the second conductor, and also the bushing portion on the second side of the high voltage arrangement, an insulation surface without any gaps is provided. Hence, an insulating structure without a creep path can be obtained.

Creep paths depend on the voltage level utilized in the equipment. Creep paths have to be very long for very high voltages, such as 800-1100 kV which is used in HVDC systems. Since there is no need for a creep path by utilizing the present insulating structure, the insulating structure and hence the insulating system of the present high voltage arrangement can be designed to be much more compact. As a result, the high voltage arrangement may be designed to be less space consuming, wherein less material is needed to manufacture the high voltage arrangement.

Beneficially, by means of the present insulating structure, costs can be saved during manufacturing of the high voltage arrangement as the high voltage arrangement may be designed to be smaller than in the prior art. Moreover, the present disclosure provides a more reliable insulating structure and hence a more reliable high voltage device when in operation, because the design of the insulating structure has no creep path. Since there is no creep path, a reduced risk of arcing may be achieved.

The insulating structure may extend to a point of the bushing portion where the electric potential of the external surface of the bushing portion is essentially equal to the potential of the interfacing plane.

The insulating structure may be formed by joining a first insulating part providing insulation around the bushing portion and a second insulating part providing insulation of the second conductor. Thereby, existing insulating systems may easily be modified to eliminate the creep path.

The first insulating part and the second insulating part may be joined together by means of layers of insulating cellulose material.

The layers may be wound around a joint between the first insulating part and the second insulating part, thereby forming the insulating structure as a one piece insulating structure.

The insulating structure may be made of cellulose material.

The first side may be an air side and the second side may be a liquid dielectric medium side.

The high voltage arrangement may be an HVDC converter transformer.

The second conductor may be connected to a transformer winding of the high voltage arrangement.

The interfacing plane may be a turret wall.

Additional features and advantages will be disclosed in the following.

BRIEF DESCRIPTION OF THE DRAWINGS

The invention and the advantages thereof will now be described by way of non-limiting examples, with reference to the accompanying drawings of which:

FIG. 2a is a schematic view of a section of a bushing and an insulating structure of the high voltage arrangement in FIG. 1a.

DETAILED DESCRIPTION OF THE INVENTION

In the following description, for purpose of explanation and not limitation, specific details are set forth, such as particular techniques and applications in order to provide a thorough understanding of the present disclosure. However, it will be apparent for a person skilled in the art that the present disclosure may be practiced in other embodiments that depart from these specific details. In other instances, detailed description of well-known methods and apparatuses are omitted so as not to obscure the description with unnecessary details.

The present disclosure concerns a high voltage arrangement and its insulating structure for a bushing and conductors associated with the bushing. In particular, the insulation structure is arranged to provide insulation for the bushing and the conductors such that the bushing safely can be received by an interfacing plane having a different electric potential than the conductors. Typically the interfacing plane is a ground plane.

The high voltage arrangement according to the present disclosure may for instance be exemplified by an inductive device such as an HVDC converter transformer, a power transformer for alternating current, or a smoothing reactor.

Figure 1A:
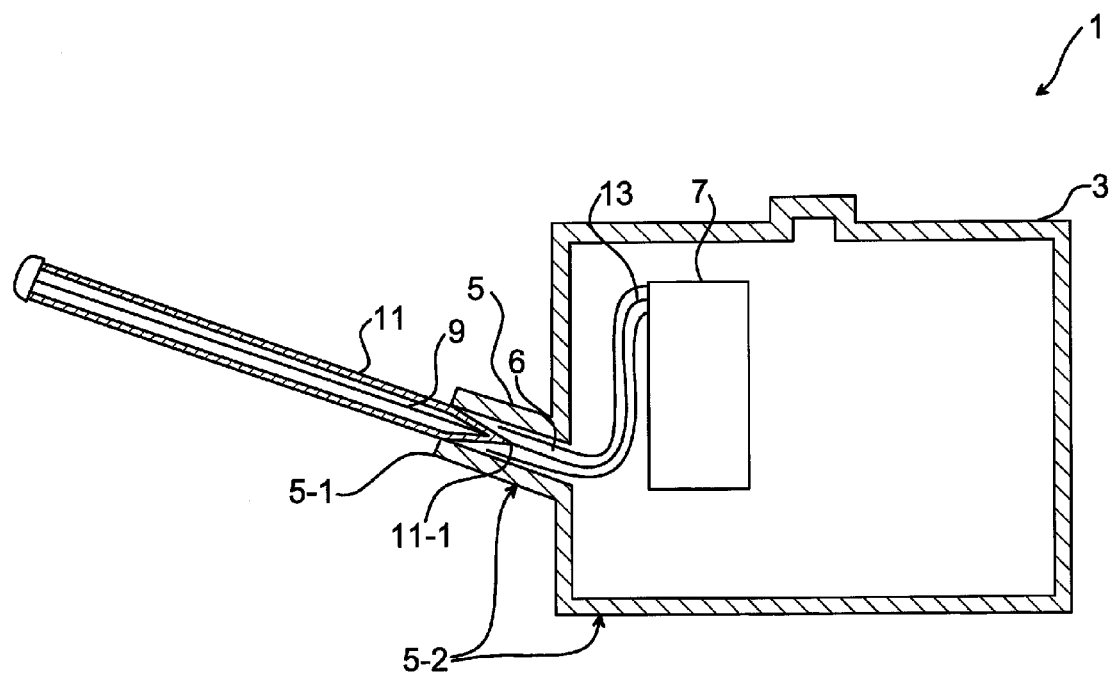
FIG. 1a is a schematic view of a partial section of an example of a high voltage arrangement for high voltage direct current applications.
Figure 1B:
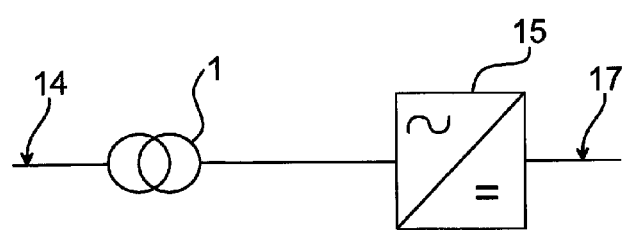
FIG. 1b is a schematic single line diagram of a high voltage arrangement in a portion of a transmission network.

With reference to FIG. 1a, a first example of a high voltage arrangement 1 will now be described in more detail. In particular in this first example, the high voltage arrangement 1 is exemplified by an HVDC converter transformer.

The high voltage arrangement 1, in which details not relevant for the present disclosure have been omitted, comprises a tank 3 provided with an opening, a turret 5 having a turret wall 5-1 and which turret 5 is arranged around the opening of the tank 3, an inductive transformer core 7 arranged in the tank 3, a bushing 11 and an insulation structure 6.

The turret walls 5-1 and the tank 3 present an interfacing plane 5-2 and are grounded. The interfacing plane forms a ground plane 5-2 of the high voltage arrangement 1. The turret 5 and the tank 3 form a housing of the high voltage arrangement 1.

The tank 3 and the turret 5, i.e. the housing, are filled with a dielectric medium, typically a dielectric fluid such as transformer oil. The insulating structure 6 may in one embodiment be immersed in the dielectric medium.

The bushing 11 has a bushing portion 11-1 arranged in the turret 5, a first conductor 9 extending through the bushing 11, and a second conductor 13 connected to the first conductor 9.

The second conductor 13 can be in direct physical connection with secondary windings, or alternatively with primary windings, of the high voltage arrangement 1. Thus, the second conductor 13 can be connected to transformer windings of the high voltage arrangement 1.

The insulating structure 6 is arranged to provide insulation around the first conductor 9, the second conductor 13 and at least a portion of the bushing portion 11-1.

The turret 5, which acts as a support for the bushing 11, may be fixed to the tank 3 by means of a plurality fastening means such as a screw joint, and sealing means in order to provide a sealed structure such that any fluid dielectric medium is contained in the interior of the high voltage arrangement 1. Alternatively, the turret 5 may be fixed to the tank 3 by welding the turret 5 to the tank 3. In one embodiment, the turret and the tank may be formed as an integrated one piece structure.

In one embodiment the turret may have zero height extension with respect to the tank, i.e. the tank has no protruding turret, whereby the bushing is arranged directly in the tank of the high voltage arrangement. In such an embodiment, the tank alone forms the ground plane through which the bushing is received.

It is to be noted that an HVDC converter transformer typically has more than one turret, e.g. a plurality of turrets, with one bushing arranged in each turret. In one embodiment the insulating structure of each turret on the valve side of the high voltage device, i.e. the side which is connectable to power converters has the same structure.

Figure 2A:
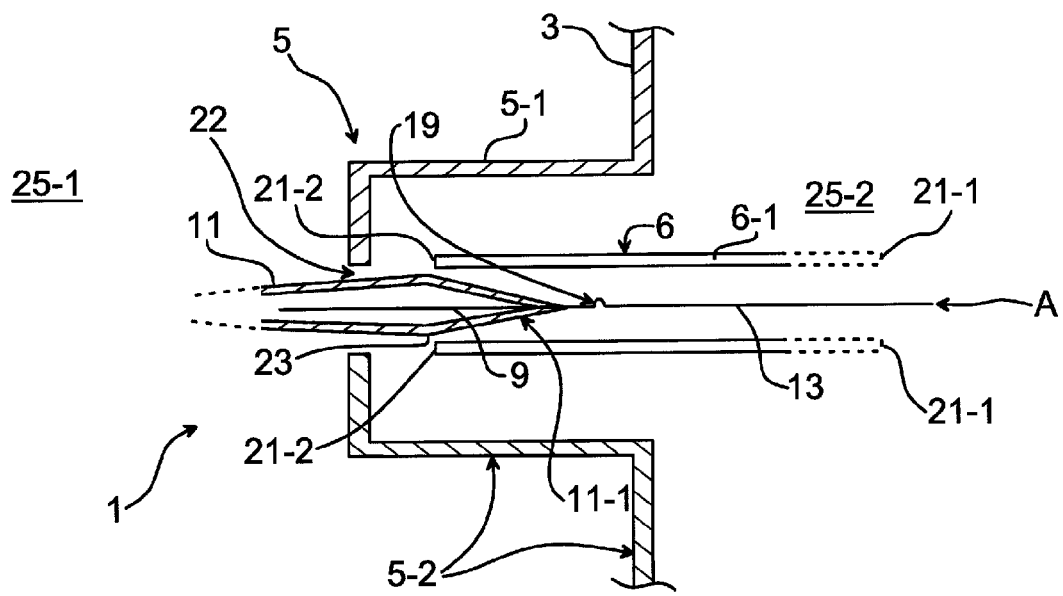

With reference to FIG. 2a, the insulating structure 6 when arranged around the bushing portion 11-1 will now be described in more detail.

It is to be noted that an insulating system for e.g. an HVDC converter transformer typically, in addition to the insulating structure 6, comprises further insulating parts, e.g. shielding electrodes for shielding a connection between the first and the second conductors 9, 13 and one or more pressboard barriers extending axially around the said conductors. These and other parts are omitted in FIG. 2 in order to provide a clear illustration of the insulating structure 6.

The interfacing plane i.e. the ground plane 5-2 defines an interface between a first side 25-1 and a second side 25-2 of the high voltage arrangement 1. In one embodiment, the first side 25-1 may be an air side, e.g. a side external to the housing 3 of the high voltage arrangement 1. The second side 25-2 may be a liquid dielectric medium side such as an oil-filled side. The bushing 11 is received through an opening 22 of the ground plane 5-1, i.e. an opening in the turret wall 5-1.

Figure 2B:
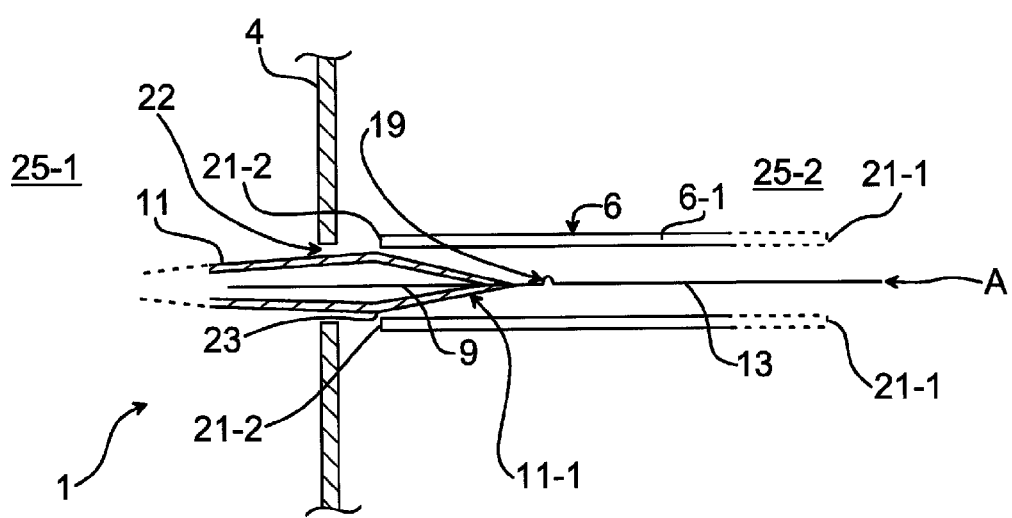
FIG. 2b is another example of a high voltage arrangement.

Alternatively, in embodiments of the high voltage arrangement which has no turret, the bushing can be received directly by an opening in an interfacing plane 4 e.g. a ground plane such as a housing of the high voltage arrangement, as shown in FIG. 2b.

When the bushing 11 is arranged in the ground plane 5-2, the bushing portion 11-1 protrudes on the second side 25-2 of the ground plane 5-2. The first conductor 9 extends through the bushing 11 and protrudes from the bushing portion 11-1 at the second side 25-2. The first conductor 9 and the second conductor 13 are electrically connected at the second side 25-2 thereby forming a connection 19.

The insulating structure 6 has a body 6-1 which extends continuously between a first end 21-1 and a second end 21-2 thereof.

In the example of FIG. 2a, the insulating structure 6 is arranged around the first conductor 9 and the second conductor 13 at the second side 25-2 of the high voltage arrangement 1. The insulating structure 6 is arranged such that it extends from the interior of the tank 3 into the turret 5 without any axial gaps along an axis A. The axis A is defined by the first conductor 9 and the second conductor 13 in the turret 5. Thus, the insulating structure 6 extends continually along the axis A in the turret 5. In other words the insulating structure 6 continuously extends in the turret 5 such that it encloses or receives the first conductor 9, the second conductor 13, and at least a portion of the bushing portion 11-1 which is arranged in the turret 5.

In general the above-described arrangement of the insulating structure also applies to embodiments of the high voltage arrangement which has no turret, where the bushing is received by an opening in a ground plane which is not a turret wall.

In one variation of the insulating structure 6, the insulating structure 6 has an axial extension such that it receives the bushing portion 11-1 about its widest portion 23 on the second side 25-2. The insulating structure 6 hence encloses the bushing portion 11-1 such that it encloses the widest portion 23 of the bushing portion 11-1 at the second side 25-2 without any gaps along the extension of the insulating structure on the second side 25-2.

The insulating structure 6 is arranged around the second conductor 13 and continuously extends in the axial direction coaxially with axis A such that it receives or covers a portion of the bushing portion 11-1. In one embodiment the insulating structure 6 continuously extends from its first end 21-1 to its second end 21-2 which is essentially in level with a point of the bushing portion 11-1 where an electric potential of an external surface of the bushing portion 11-1 is at most equal to the average of the electric potential of the first conductor 9 and the potential of the interfacing plane 5-1 when the high voltage arrangement 1 is in use. The electric potential decreases linearly along the external surface of the bushing portion 11-1 in the axial direction towards an opening 22 in the ground plane 5-2. The maximal electric potential to which the bushing portion 11-1 is subjected to is generally attained at its end portion from which the first conductor 9 protrudes.

By providing the insulating structure 6 with a continuous body on the second side 25-2 of the ground plane 5-2 such that it extends around the bushing portion 11-1 at least to a point, in the direction towards the interfacing plane, of the bushing portion 11-1 where an external surface of the bushing portion 11-1 has an electric potential which is at most equal to the average of the electric potential of the first conductor 9 and the potential of the interfacing plane when the high voltage arrangement 1 is in use, the creep path provided by the prior art is eliminated. Hence a more compact insulating system can be obtained in the high voltage arrangement 1. Therefore, the insulation system comprising the insulating structure 6 of the high voltage arrangement 1 may be reduced in size, whereby the size of the high voltage arrangement can be reduced.

In one embodiment, the first end of the insulating structure ends at such an axial distance from the connection 19 that the insulation structure is subjected to 50% or less of the DC voltage level to which the insulating structure is subjected to at the connection 19.

In one embodiment, the insulation structure extends to the interfacing plane, i.e. the ground plane. In this case, the second end of the insulation structure is essentially in physical contact with the ground plane. Alternatively, the second end may be in actual physical contact with the ground plane or grounded parts associated with the ground plane. Thus, the second end of the insulating structure may receive the bushing portion to a point where the potential of the bushing portion is essentially equal to, or equals to the potential of the interfacing plane.

In one embodiment, there is a gap between the insulating structure and the ground plane, i.e. the second end of the insulating structure is distanced from the interfacing plane. In such an embodiment, there is no need to provide additional insulation in the gap between the insulating structure and the interfacing plane, as the electric potential around the bushing is sufficiently low in the area between the second end of the insulating structure and the interfacing plane.

In one example of the insulating structure, the insulating structure may be formed as an integrated one-piece body when manufactured. Alternatively, the insulating structure may be formed by joining a first insulating part and a second insulating part. The first insulating part may e.g. be a bushing insulating barrier, and the second insulating part may be a transformer insulator. The first insulating part and the second insulating part may in this case be joined e.g. by winding insulating material e.g. cellulose material such as paper, around the joint between the first insulating part and the second insulating part. In one embodiment, the insulating structure can be formed of more than two parts.

The insulating structure 6 may be manufactured of a cellulose material such as pressboard or paper.

The present disclosure provides a high voltage arrangement having an insulating structure which results in a more compact and due to the reduced creep paths, a more reliable insulating system in the high voltage arrangement. The insulating structure may particularly be suited for high voltage arrangements which have an integrated housing. An example of such an arrangement is a transformer having an integrated turret, e.g. a housing where the turret and the tank is integrated. It is envisaged that the present disclosure will find applications in HVDC transformers, smoothing reactors, AC transformers and reactors for AC networks, and other similar equipment in HVDC or FACTS environments. In particular, the insulating structure may be utilized in any high voltage application where a bushing is arranged to be received through a ground plane.

The skilled person in the art realizes that the present invention by no means is limited to the examples described hereabove. On the contrary, many modifications and variations are possible within the scope of the appended claims.

What is claimed is:

1. A high voltage arrangement for a high voltage power system, which high voltage arrangement comprises:
   an interfacing plane defining an interface between a first side and a second side of the high voltage arrangement,
   a bushing having a bushing portion received by the interfacing plane whereby the bushing extends from the first side to the second side of the high voltage arrangement,
   a first conductor extending through the bushing, which first conductor protrudes from the bushing portion at the second side of the high voltage arrangement,
   a second conductor connected to the first conductor at the second side, and
   an insulating structure arranged around the second conductor for providing insulation of the second conductor, wherein the insulating structure has a continuous extension in an axial direction from a first end thereof providing insulation of essentially the entire length of the second conductor to a second end of the insulating structure arranged around the bushing portion, which second end extends around the bushing portion at least to a point where an electric potential of an external surface of the bushing portion is at most equal to the average of the potential of the first conductor and the potential of the interfacing plane when the high voltage arrangement is in use.

2. The high voltage device of claim 1, which insulating structure extends to a point of the bushing portion where the electric potential of the external surface of the bushing portion is essentially equal to the potential of the interfacing plane.

3. The high voltage arrangement of claim 1, wherein the insulating structure is arranged to receive the entire length of the second conductor to thereby insulate the second conductor.

4. The high voltage arrangement of claim 1, wherein the insulating structure is formed by joining a first insulating part providing insulation around the bushing portion and a second insulating part providing insulation of the second conductor.

5. The high voltage arrangement of claim 4, wherein the first insulating part and the second insulating part are joined together by means of layers of insulating cellulose material.

6. The high voltage arrangement of claim 5, wherein the layers are wound around a joint between the first insulating part and the second insulating part, thereby forming the insulating structure as a one piece insulating structure.

7. The high voltage arrangement of claim 1, wherein the insulating structure is made of cellulose material.

8. The high voltage device of claim 1, wherein the first side is an air side and the second side is a liquid dielectric medium side.

9. The high voltage arrangement of claim 1, which high voltage arrangement is an HVDC converter transformer.

10. The high voltage arrangement of claim 1, wherein the second conductor is connected to a transformer winding of the high voltage arrangement.

11. The high voltage arrangement of claim 10, wherein the interfacing plane is a turret wall.

* * * * *